(12) United States Patent
Huemiller

(10) Patent No.: US 11,552,284 B2
(45) Date of Patent: Jan. 10, 2023

(54) BATTERY ELECTRODE HAVING NETWORK OF INTERCONNECTED HIGH POROSITY REGIONS AND METHOD OF MANUFACTURING THE SAME

(71) Applicant: GM GLOBAL TECHNOLOGY OPERATIONS LLC, Detroit, MI (US)

(72) Inventor: Erik D. Huemiller, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 17/084,037

(22) Filed: Oct. 29, 2020

(65) Prior Publication Data

US 2022/0140353 A1 May 5, 2022

(51) Int. Cl.
*H01M 4/04* (2006.01)
*H01M 4/139* (2010.01)
*H01M 4/13* (2010.01)

(52) U.S. Cl.
CPC .............. *H01M 4/13* (2013.01); *H01M 4/043* (2013.01); *H01M 4/0404* (2013.01); *H01M 4/139* (2013.01)

(58) Field of Classification Search
CPC ...... H01M 4/02; H01M 4/0404; H01M 4/043; H01M 4/13–1399
See application file for complete search history.

(56) References Cited

U.S. PATENT DOCUMENTS

2006/0251965 A1* 11/2006 Nagayama .......... H01M 50/543
429/231.95
2013/0022868 A1* 1/2013 Yang .................... H01M 4/139
429/232

* cited by examiner

Primary Examiner — Eugenia Wang
(74) Attorney, Agent, or Firm — Quinn IP Law

(57) ABSTRACT

A battery electrode includes an electrically conductive sheet and two or more coating layers of an ion transport medium stacked thereon. Each coating layer has a respective two-dimensional array of low porosity regions formed therein, with a remainder of each coating layer that is not the two-dimensional array of low porosity regions defining a respective network of interconnected high porosity regions. Each of the high porosity regions has a feature size D, and an intralayer pitch P is defined between adjacent ones of the high porosity regions of each coating layer, with each pair of adjacent two-dimensional arrays having a respective alignment error E therebetween. A respective first electrically conductive path is formed thereacross via the networks of high porosity regions when $D \leq E \leq P$, with a second electrically conductive path being formed across all of the coating layers via the networks of high porosity regions.

20 Claims, 9 Drawing Sheets

BATTERY ELECTRODE HAVING NETWORK OF INTERCONNECTED HIGH POROSITY REGIONS AND METHOD OF MANUFACTURING THE SAME

INTRODUCTION

This disclosure relates generally to battery electrodes in which each electrode has a network of interconnected high porosity regions, and methods of manufacturing such battery electrodes.

Batteries have opposing positively and negatively charged electrodes, known as cathodes and anodes, respectively. One way of manufacturing battery electrodes is to form each one as a multilayer sandwich, starting with an electrically conductive sheet and coating the sheet with successive layers of a suitable ion transport medium having a starting porosity and density. After each coating layer is applied (and before the next coating layer is added), the exposed surface of the newly applied layer may be pressed with a tool, die or the like to form a "patterned" coating layer, in which a majority of the layer's surface area is compressed into regions of lower porosity and higher density (LP/HD) than the starting porosity and density, and with the remainder of the surface area that is not compressed forming an ordered pattern of higher porosity/lower density (HP/LD) regions which maintain the original starting porosity and density.

The HP/LD regions are customarily spaced far apart from each other; i.e., the distance separating adjacent HP/LD regions is usually much greater than the overall feature size of each HP/LD region. When a new coating layer is added onto a patterned coating layer, it is customary to attempt to align the new coating layer so that the newly formed HP/LD regions will be stacked right on top of the HP/LD regions of the previous patterned coating layer. This is so that an electrically conductive path is provided through each "stack" of aligned HP/LD regions. However, it is difficult to assure the registration of each subsequent layer of HP/LD regions with the previous layer of HP/LD regions.

SUMMARY

According to one embodiment, a method of manufacturing a battery electrode includes: applying a coating of an ion transport medium onto a first surface of an electrically conductive sheet; forming a two-dimensional array of low porosity regions on the coating; applying a subsequent coating of the ion transport medium onto the previously applied coating; and forming a subsequent two-dimensional array of low porosity regions on the subsequent coating. A respective remainder of each coating that is not the respective two-dimensional array of low porosity regions defines a respective network of interconnected high porosity regions, wherein, for each coating, each of the low porosity regions thereof is surroundably bordered by a respective one or more of the high porosity regions thereof. Each of the high porosity regions has a respective feature size D, and an intralayer pitch P is defined between adjacent ones of the high porosity regions of each coating, such that each pair of adjacent two-dimensional arrays has a respective alignment error E therebetween and wherein a respective first electrically conductive path is formed thereacross via the respective networks of high porosity regions when $D \leq E \leq P$, and wherein a second electrically conductive path is formed across all of the coatings via the networks of high porosity regions. The method may further include repeating, for a plurality of cycles, the steps of applying a subsequent coating and forming a subsequent two-dimensional array of low porosity regions.

Each two-dimensional array may have substantially the same arrangement of low porosity regions and high porosity regions as each other two-dimensional array. For each coating, the low porosity regions thereof may have a lower porosity and/or a higher density than the high porosity regions thereof. Additionally, the feature size D may be a width as measured between adjacent low porosity regions.

Each two-dimensional array of low-porosity regions may be formed using a stamp or roller having a pattern of embossments on a patterning surface thereof, wherein the embossments are arranged on the patterning surface so as to correspond to each two-dimensional array of low porosity regions. Each of the low porosity regions may have a respective tileable shape, wherein each respective tileable shape may be one or more of a square, a triangle, a non-square rectangle, a non-rectangular parallelogram, a trapezoid, a hexagon, a rhombus and a cross shape. Alternatively, each of the low porosity regions may have a respective non-tileable shape, wherein each respective non-tileable shape may be one or more of a circle, an ellipse, a pentagon, a cloud shape and a star shape. In any of the above configurations, the ratio of the feature size to the intralayer pitch—i.e., D/P—may be greater than or equal to 0.10 and less than or equal to 0.50.

According to another embodiment, a method of manufacturing a multilayer battery electrode includes: (i) applying a coating layer of an ion transport medium onto a first surface of an electrically conductive sheet; (ii) impressing the coating layer so as to form a two-dimensional array of high density impressed regions on a top surface of the coating layer; (iii) applying a subsequent coating layer of the ion transport medium onto the previously applied coating layer; (iv) impressing the subsequent coating layer so as to form a subsequent two-dimensional array of high density impressed regions on an exposed surface of the subsequent coating layer; and (v) repeating steps (iii) and (iv) for a plurality of cycles. A respective remainder of each coating layer that is not the respective two-dimensional array of high density impressed regions defines a respective network of interconnected low density regions, wherein, for each coating layer, each of the high density impressed regions thereof is surroundably bordered by a respective one or more of the low density regions thereof. Each of the low density regions has a respective feature size D characterized as a width as measured between adjacent high density impressed regions, and an intralayer pitch P is defined between adjacent ones of the low density regions of each coating layer, such that each pair of adjacent two-dimensional arrays has a respective alignment error E therebetween and wherein a respective first electrically conductive path is formed thereacross via the respective networks of low density regions when $D \leq E \leq P$, wherein a second electrically conductive path is formed across all of the coating layers via the networks of low density regions.

In this embodiment, each two-dimensional array may have substantially the same arrangement of high density impressed regions and low density regions as each other two-dimensional array. For each coating layer, the high density impressed regions thereof may have a higher density and a lower porosity than the low density regions thereof. Each of the high density impressed regions may have a respective tileable shape (wherein each respective tileable shape is one or more of a square, a triangle, a non-square rectangle, a non-rectangular parallelogram, a trapezoid, a hexagon, a rhombus and a cross shape) or a respective non-tileable shape (wherein each respective non-tileable shape is one or more of a circle, an ellipse, a pentagon, a cloud shape and a star shape).

According to yet another embodiment, a battery electrode includes an electrically conductive sheet having a first surface, and two or more coating layers of an ion transport medium stacked upon the first surface. Each coating layer has a respective two-dimensional array of low porosity impressed regions formed therein, wherein a respective remainder of each coating layer that is not the respective two-dimensional array of low porosity impressed regions defines a respective network of interconnected high porosity regions, wherein, for each coating layer, each of the low porosity impressed regions thereof is surroundably bordered by a respective one or more of the high porosity regions thereof. Each of the high porosity regions has a respective feature size D and an intralayer pitch P is defined between adjacent ones of the high porosity regions of each coating layer, such that each pair of adjacent two-dimensional arrays has a respective alignment error E therebetween, and wherein a respective first electrically conductive path is formed thereacross via the respective networks of high porosity regions when $D \leq E \leq P$, with a second electrically conductive path being formed across all of the coating layers via the networks of high porosity regions.

In the above battery electrode, each two-dimensional array may have substantially the same arrangement of low porosity impressed regions and high porosity regions as each other two-dimensional array. For each coating layer, the feature size D may be a width as measured between adjacent low porosity impressed regions, and the low porosity impressed regions thereof may have a lower porosity and a higher density than the high porosity regions thereof. Each of the low porosity impressed regions may have: (i) a respective tileable shape, wherein each respective tileable shape is one or more of a square, a triangle, a non-square rectangle, a non-rectangular parallelogram, a trapezoid, a hexagon, a rhombus and a cross shape; or (ii) a respective non-tileable shape, wherein each respective non-tileable shape is one or more of a circle, an ellipse, a pentagon, a cloud shape and a star shape. The ratio of feature size to intralayer pitch D/P may have the range $0.10 \leq D/P \leq 0.50$, or it may have the range $0.20 \leq D/P \leq 0.33$.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
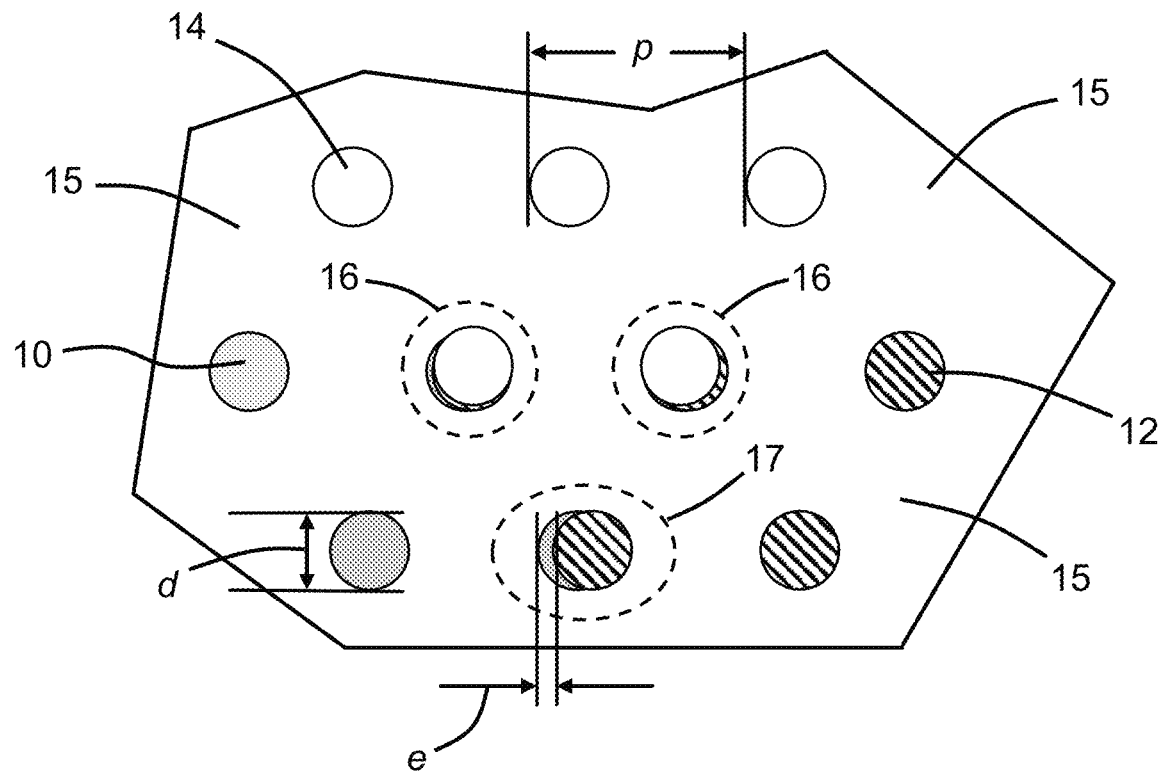
FIG. 1 is a schematic plan view of three patterned coating layers registered according to a customary registration approach.

Referring now to the drawings, wherein like numerals indicate like parts in the several views, a multilayer battery electrode 20, and methods 100, 200 of manufacturing the battery electrode 20, are shown and described herein. As introduced above, the abbreviations "LP/HD" and "HP/LD" are used herein to denote regions that are either low porosity/high density or high porosity/low density, respectively. As described herein, "low porosity" and "high density" may be used interchangeably, and "high porosity" and "low density" may be used interchangeably. Note that "low" and "high" represent relative comparisons with each other (e.g., low porosity versus high porosity, and low density versus high density) and do not necessarily represent any absolute values or quantities.

The multilayer battery electrodes 20 of the present disclosure, including those produced by the methods 100, 200 of the present disclosure, solve the technical problem of misalignment or misregistration described above, by the technical effect of having LP/HD regions 36, 46, 56 (which may be formed by impression and/or compression) and HP/LD 39, 49, 59 (which are not necessarily impressed or compressed) on each coating layer 30, 40, 50, in which both groups are purposefully sized, shaped and arranged so as to provide a respective first electrically conductive path 64 between each pair of adjacent coating layers 30, 40, 50, and a second electrically conductive path 66 across all of the coating layers 30, 40, 50, even when there is an alignment error between any pair of adjacent coating layers 30, 40, 50. In fact, the electrodes 20 and methods 100, 200 of the present disclosure can tolerate much larger alignment errors than customary electrodes and methods, thus providing a significant technical advantage over other approaches.

FIG. 1 shows a schematic plan view of three patterned coating layers registered according to a customary registration approach. A first or bottom layer is shown as a "W" pattern of gray circles, one of which is represented by reference numeral 10. A second or middle layer is shown as a "W" pattern of cross-hatched circles, one of which is represented by reference numeral 12, and a third or top layer is shown as a "W" pattern of plain circles, one of which is represented by reference numeral 14. These circles 10, 12, 14, as well as those to which no reference numerals are assigned in the drawings, represent respective HP/LD regions, and the empty space around and between these circles represents compressed LP/HD regions 15. The circles 10, 12, 14 or HP/LD regions each have a respective overall feature size d, which in this case would be the respective diameter of each circle 10, 12, 14. The circles 10, 12, 14 or HP/LD regions also have an intralayer pitch p measured between the center of any given HP/LD region to the center of its closest neighboring HP/LD region (or measured between an edge of any given HP/LD region to the corresponding edge of its closest neighboring HP/LD region).

In customary practice, the intralayer pitch p is maintained as a constant across each coating layer and also among all of the coating layers, thus making the pattern of HP/LD regions regularly repeating in order to facilitate layer-to-layer registration. In FIG. 1, note that two groups or stacks 16 of three HP/LD regions are indicated by the dashed circular lines, as well as one group or stack 17 of two HP/LD regions. Note that while a "W" shape of only five HP/LD regions is used to represent each coating layer, in actual practice each coating layer may have hundreds or thousands of such regions. Here in FIG. 1, the three "W" groupings (i.e. coating layers) are offset from each other, but it represents an effort to align as many of the individual HP/LD regions as possible (for example, the groupings 16, 17 indicated by the dashed circular lines). The amount of misalignment or misregistration between any pair of HP/LD regions on adjacent coating layers is referred to as an alignment error e, which is expressed as a distance between the respective centers (or respective corresponding edges) of the two misaligned HP/LD regions, as measured in a direction parallel to the surfaces of the coating layers. For the sake of clarity, note that the intralayer pitch p is measured between two neighboring HP/LD regions on the same coating layer, while the alignment error e is measured between two HP/LD regions on two different coating layers that are adjacent to one another. For example, FIG. 1 shows the feature size d of one HP/LD region 10 on the first or bottom (gray) layer, the intralayer pitch p between two HP/LD regions on the third or top (white) layer, and the alignment error e between two HP/LD regions where one is on the first or bottom (gray) layer and the other is on the adjacent second or middle (cross-hatched) layer.

Figure 2:
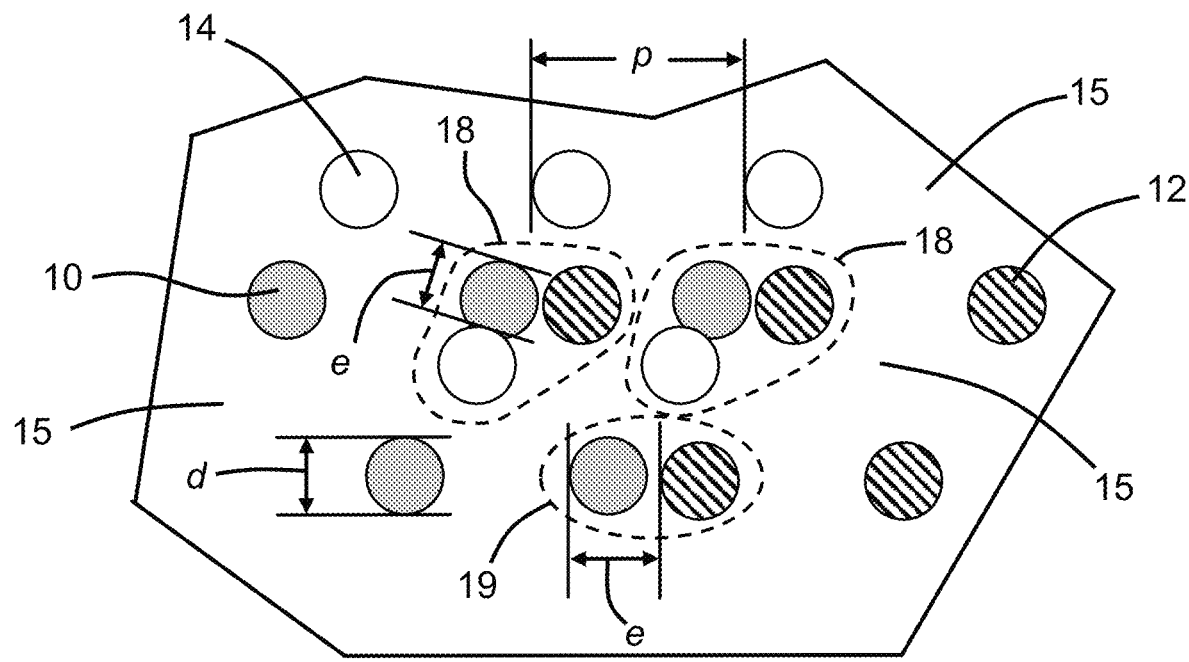
FIG. 2 is a schematic plan view of the three patterned coating layers of FIG. 1 with a small alignment error.

However, FIG. 2 represents a case where even a small amount of misalignment or misregistration of these HP/LD regions can lead to non-overlapping or barely overlapping HP/LD regions, as indicated by the dashed circular lines 18 and 19, which correspond to the dashed circular lines 16 and 17, respectively, of FIG. 1. The three layers and their respective HP/LD regions shown in FIG. 2 have the same feature size d and intralayer pitch p as in FIG. 1, but the alignment error e is larger in FIG. 2 than in FIG. 1. (One alignment error e is shown between two HP/LD regions of the bottom (gray) and middle (cross-hatched) layers, and another alignment error e is shown between two other HP/LD regions of the middle (cross-hatched) and top (white) layers.) These poor or failed alignments/registrations 18, 19 lead to undesirably poor or failed electrical connections from layer to layer, and across the entire collection of layers as a whole.

In contrast, the electrodes 20 and methods 100, 200 for manufacturing electrodes 20 according to the present disclosure solve this potential problem by sizing, shaping and/or arranging the LP/HD regions 36, 46, 56 and the HP/LD regions 39, 49, 59 so as to provide much more tolerance for alignment or registration error than the customary approaches represented by FIGS. 1-2.

Figure 3:
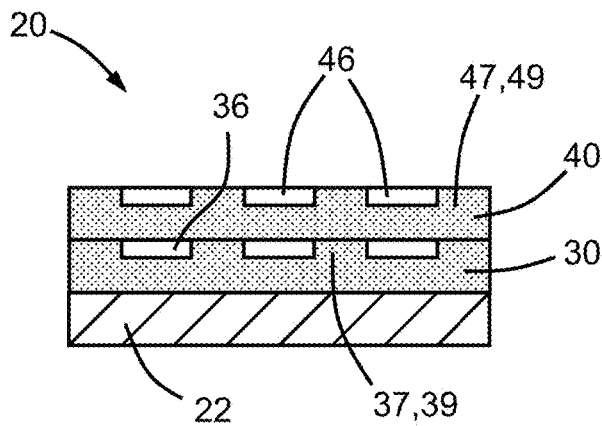
FIG. 3 is a schematic cross-sectional side view of a multilayer battery electrode.
Figure 4:
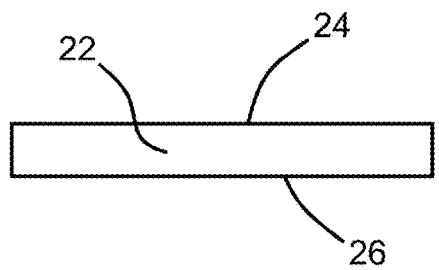
FIG. 4 is a schematic side view of an electrically conductive sheet.
Figure 5:
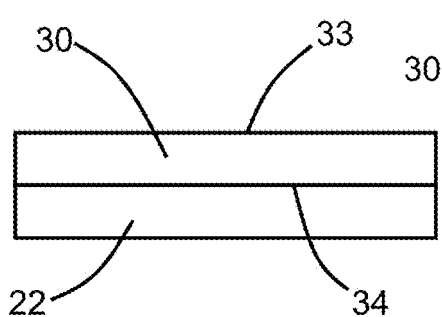
FIG. 5 is a schematic side view of the electrically conductive sheet of FIG. 4 and an added first coating layer.

FIGS. 3-12, 15A-H and 16A-F show various aspects of the battery electrodes 20, and FIGS. 13-14 and 17-18 illustrate various aspects of the methods 100, 200 for manufacturing the electrodes 20. FIG. 3 shows a schematic cross-sectional side view of a multilayer battery electrode 20, formed as a multilayer sandwich. FIG. 4 shows a schematic side view of an electrically conductive sheet 22 which is provided, with the sheet 22 having a first or top surface 24 and second or bottom surface 26 opposed to the first surface 24. The sheet may be made of aluminum, copper or any other electrically conductive material suitable for use in the chemical environment of a battery. Some portions of the sheet 22 may be optionally coated with an insulating material, but at least a working portion of the first surface 24 should be uncoated and electrically conductive. FIG. 5 shows a schematic side view of the electrically conductive sheet 22 with a first or base coating layer 30 added onto the first surface 24 of the sheet 22. This coating layer 30 is made of an ion transport medium, such as graphite-silicon for anodes, or nickel-manganese-cobalt (NMC) or nickel-manganese-cobalt-aluminum (NMCA) for cathodes. The thickness of the coating 30 may be 20 to 1000 microns, and in many cases between 100 and 500 microns. The coating layer 30 has a top or exposed surface 33, and a bottom surface 34 (opposite the top surface 33) that is in intimate contact with the first surface 24 of the sheet 22.

Figure 6:
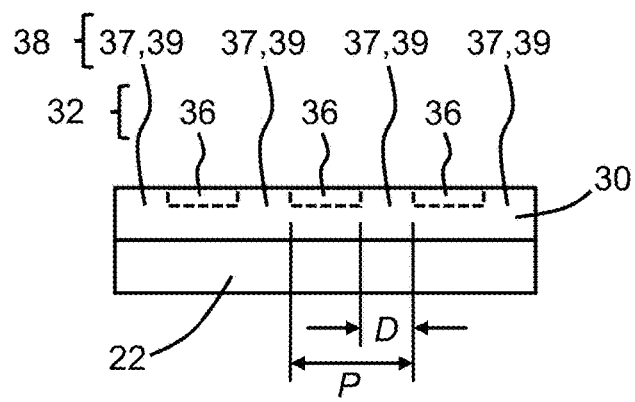
FIG. 6 is a schematic side view of the electrically conductive sheet and first coating layer of FIG. 5 after low porosity regions are formed in the first coating layer.

FIG. 6 shows a schematic side view of the electrically conductive sheet 22 and the first coating layer 30, after LP/HD regions 36 have been formed in the first coating layer 30. The LP/HD regions 36 are formed in a two-dimensional array 32 across the exposed surface 33 of the coating 30, thereby creating a "patterned" coating or layer 30. (Approaches for forming these LP/HD regions 36 in the coating 30 will be described below.) The remainder 37 of the coating layer 30 that is not the two-dimensional array 32 of LP/HD regions 36 defines a network 38 of interconnected HP/LD regions 39. Each of the LP/HD regions 36 is surroundably bordered (i.e., completely surrounded and bordered) by one or more of the HP/LD regions 39. As described in more detail below, each of the HP/LD regions 39 has a respective feature size D, and an intralayer pitch P is defined between adjacent HP/LD regions 39.

Figure 7:
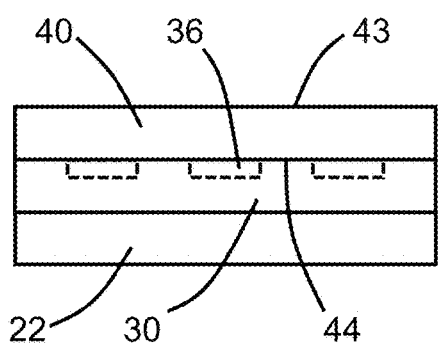
FIG. 7 is a schematic side view of the electrically conductive sheet and first coating layer of FIG. 6 with an added second coating layer.
Figure 8:
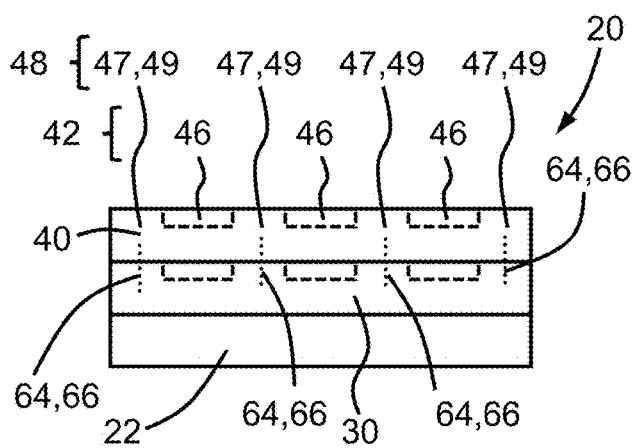
FIG. 8 is a schematic side view of the electrically conductive sheet and first and second coating layers of FIG. 7 after low porosity regions are formed in the second coating layer.

FIG. 7 shows a schematic side view of the electrically conductive sheet 22 and the first coating layer 30, with a second coating layer 40 made of an ion transport medium added atop the patterned first coating layer 30. The second coating layer 40 has a top or exposed surface 43, and a bottom surface 44 (opposite the top surface 43) that is in intimate contact with the top surface 33 of the first coating layer 30. The second coating layer 40 of ion transport medium may be made of the same material that is used for the first coating layer 30, or it may be a different material. FIG. 8 shows a schematic side view of the electrically conductive sheet 22 and the first and second coating layers 30, 40, after LP/HD regions 46 have been formed in the second coating layer 40. The LP/HD regions 46 are formed in a two-dimensional array 42 across the exposed surface 43 of the second coating 40, thereby creating a "patterned" second coating or layer 40. The remainder 47 of the second coating layer 40 that is not the two-dimensional array 42 of LP/HD regions 46 defines a network 48 of interconnected HP/LD regions 49. Each of the LP/HD regions 46 is surroundably bordered by one or more of the HP/LD regions 49. Each of the HP/LD regions 49 has a respective feature size D, and an intralayer pitch P is defined between adjacent HP/LD regions 49. With the LP/HD regions 46 and HP/LD regions 49 formed as described, a completed multilayer battery electrode 20 is formed.

Figure 9:
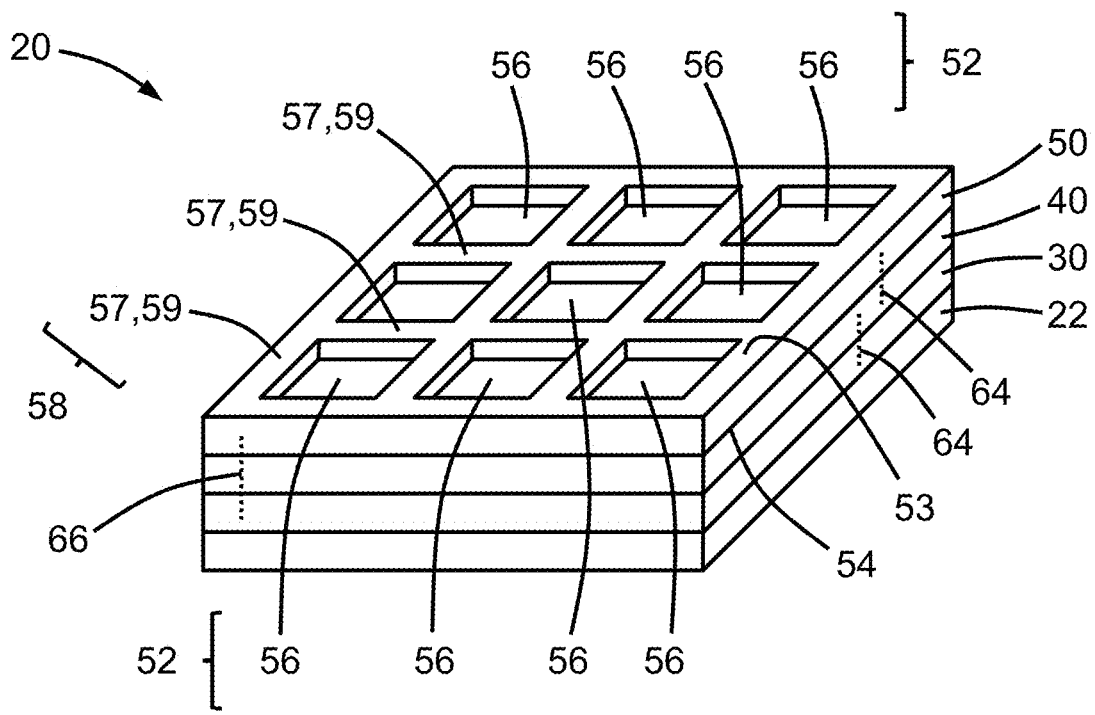
FIG. 9 is a schematic perspective view of a multilayer battery electrode having three coating layers.
Figure 10:
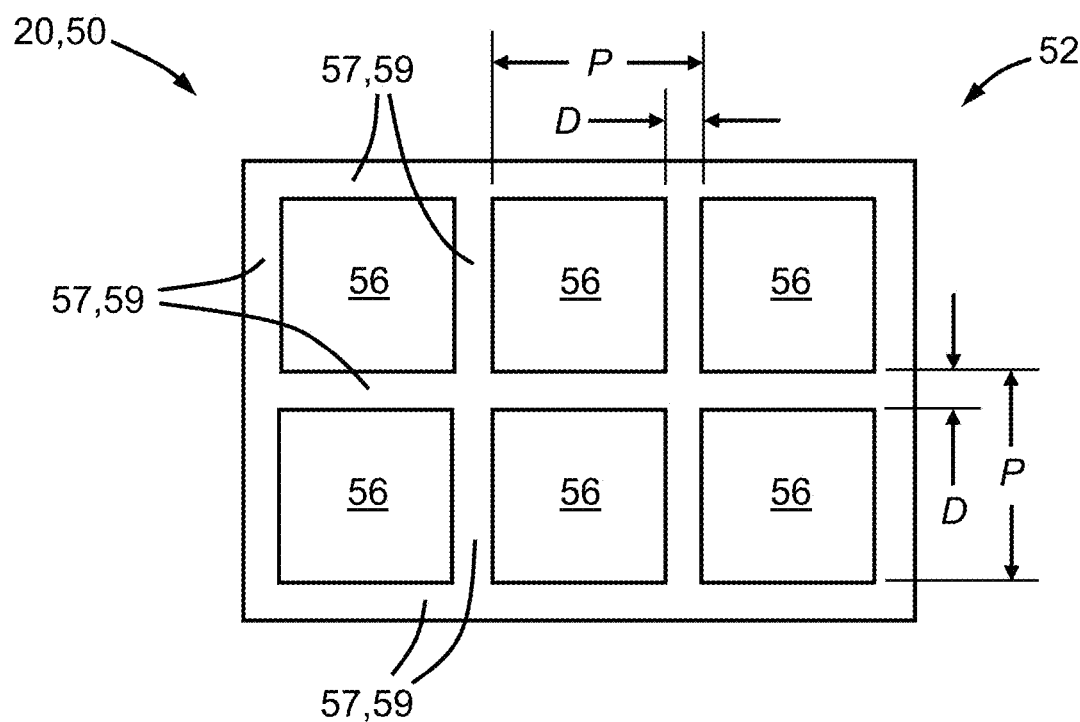
FIG. 10 is a schematic plan view of the multilayer battery electrode of FIG. 9.

FIG. 9 shows a perspective view of another configuration of the multilayer battery electrode 20, and FIG. 10 shows a schematic plan view of the configuration shown in FIG. 9. In this configuration, a third coating layer 50 has been added, with its associated array 52 of LP/HD regions 56 and network 58 of interconnected HP/LD regions 59 formed in the coating layer 50. The feature size D of each of the HP/LD regions 59 (which may be characterized or viewed as the width of a HP/LD region 59 between the edges of two adjacent LP/HD regions 56) may be on the order of 5 to 50 microns, while the intralayer pitch P between neighboring HP/LD regions 59 may be on the order of 50 to 200 microns. (These same ranges for D and P may apply to the other HP/LP regions 39, 49 on the other coating layers 30, 40 as well.) Note that the electrically conductive sheet 22 and the first, second and third coating layers 30, 40, 50 all appear to line up perfectly in FIGS. 9-10 with no apparent misalignment or misregistration among the three layers 30, 40, 50.

Figure 11:
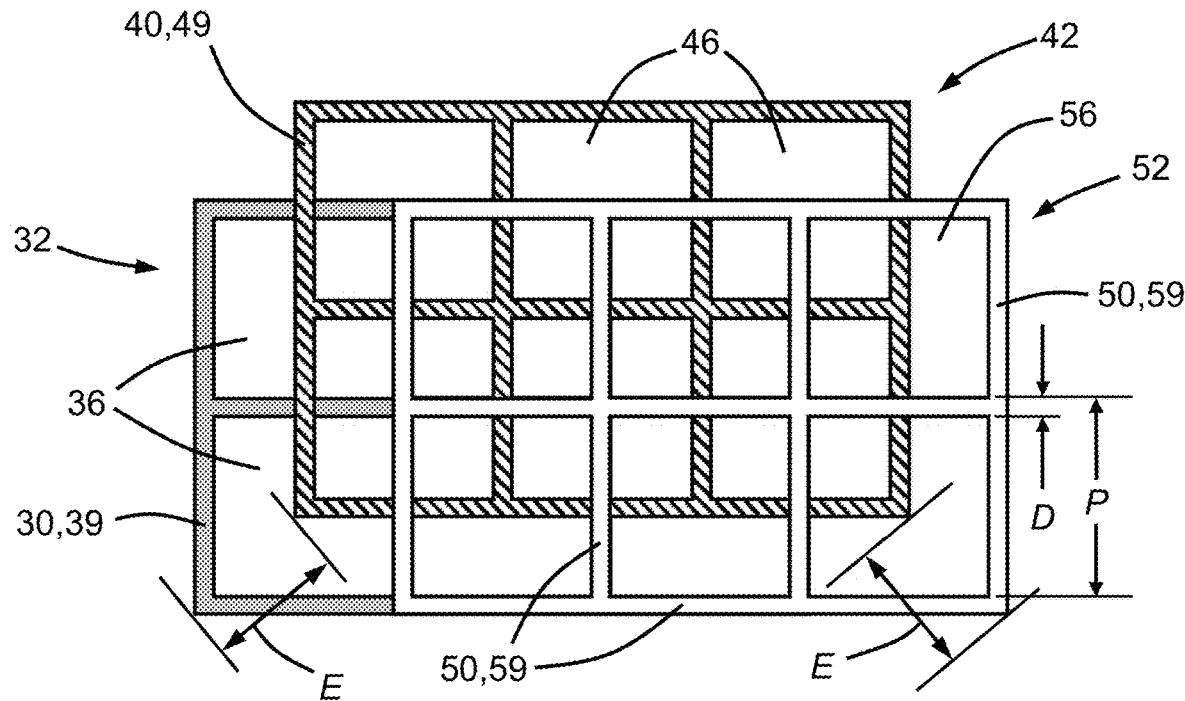
FIGS. 11-12 are schematic plan views of two possible arrangements of first, second and third coating layers.
Figure 12:
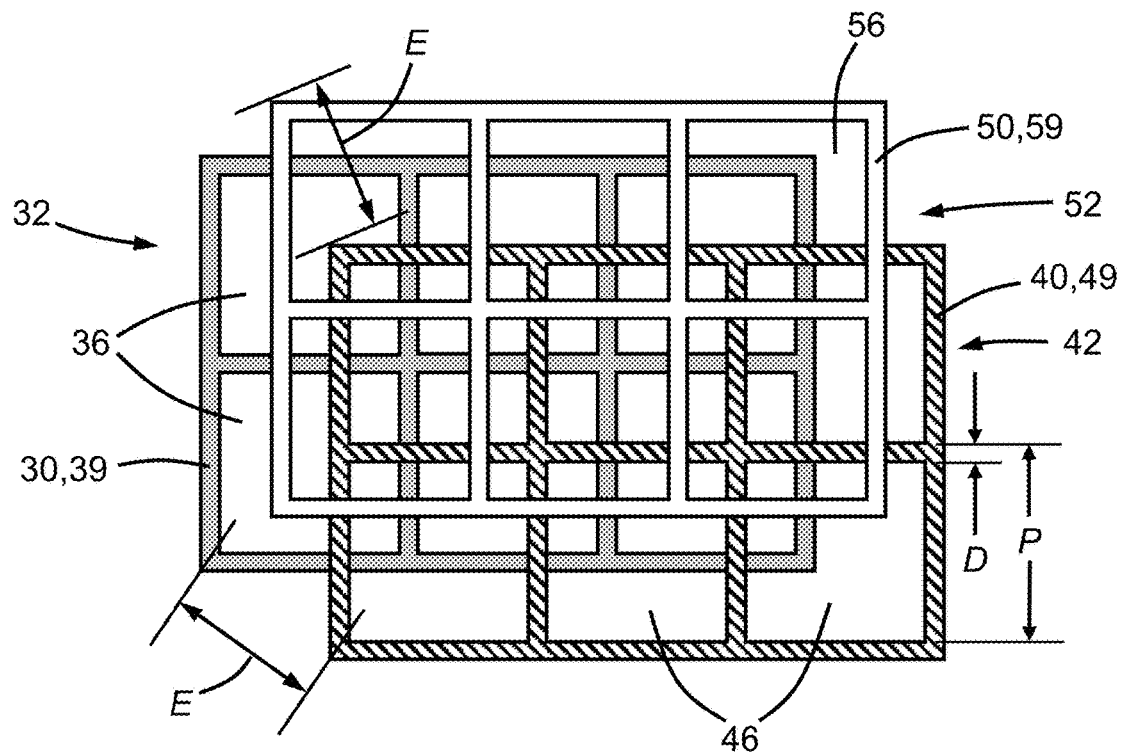

However, FIGS. 11-12 show schematic plan views of two other possible arrangements of the first, second and third coating layers 30, 40, 50 in which there is some misalignment among the three layers 30, 40, 50. (Note that the LP/HD regions are illustrated here as empty square "holes", with each coating layer 30, 40, 50 appearing as a grid or network 38, 48, 58 of HP/LD regions 39, 49, 59, but this is merely for illustration purposes so that the overlapping of the HP/LD regions 39, 49, 59 can be more easily seen.) As mentioned above, a respective alignment or registration error E may occur between each pair of adjacent two-dimensional arrays 32, 42, 52 (e.g., between the first and second arrays 32, 42, between the second and third arrays 42, 52, etc.). The alignment or registration error E between two adjacent arrays is defined as the distance between any given HP/LD region 39, 49, 59 of one array 32, 42, 52 or layer 30, 40, 50 and the closest HP/LD region 39, 49, 59 of the other adjacent array 32, 42, 52 or layer 30, 40, 50, as measured in a direction parallel to the surfaces of the two adjacent arrays. Note that the alignment error E is not necessarily a measure of how far an entire array is offset from an adjacent array, but instead is a measure of how far each individual HP/LD region of one array is offset from the closest HP/LD region of the other adjacent array.

For example, FIG. 11 shows one alignment error E between (i) a HP/LD region 39 of the bottom (gray) array 32 or layer 30 and (ii) a corresponding adjacent HP/LD region 49 of the middle (cross-hatched) array 42 or layer 40, plus another alignment error E between (iii) a HP/LD region 49 of the middle (cross-hatched) array 42 or layer 40 and (iv) a corresponding adjacent HP/LD region 59 of the top (white) array 52 or layer 50. (Note that while the two alignment errors E in FIG. 11 are shown as being diagonally measured between two HP/LD region corners, the alignment errors E may also be measured horizontally or vertically between two corresponding adjacent HP/LD region straight sections.)

FIG. 12 shows a different arrangement of the three arrays 32, 42, 52 or coating layers 30, 40, 50, with a different (and larger) pair of alignment errors E between the HP/LD regions 39, 49, 59 of adjacent arrays 32, 42, 52 or layers 30, 40, 50. Even with this larger amount of alignment error E, the HP/LD regions 39, 49, 59 overlap each other between adjacent layers 30, 40, 50—i.e., between the bottom (gray) layer 30 and the middle (cross-hatched) layer 40, and between the middle (cross-hatched) layer 40 and the top (white) layer 50—thereby providing a first electrically conductive path 64 between the bottom network 32 of HP/LD regions 39 and the middle network 42 of HP/LD regions 49, and another first electrically conductive path 64 between the middle network 42 of HP/LD regions 49 and the top network 52 of HP/LD regions 59, and so on for any additional coating layers and networks that may be added. This also provides a second electrically conducting path 66 across all of the coatings 30, 40, 50 via the stacked networks 32, 42, 52 of overlapping HP/LD regions 39, 49, 59. These first and second electrically conductive paths 64, 66 may be provided even when the alignment error E is larger than the feature size D of the HP/LD regions 39, 49, 59, and even when the alignment error E is as great as the intralayer pitch P (when $D \leq E \leq P$). This increased tolerance for misalignment or misregistration is much greater than that tolerated by the aforementioned conventional approaches. (Also note that in each of the arrangements and configurations described, a continuous contact path is provided from layer to layer, and across all the layers 30, 40, 50 collectively, by the various overlapping LP/HD regions 36, 46, 56.)

Figure 13:
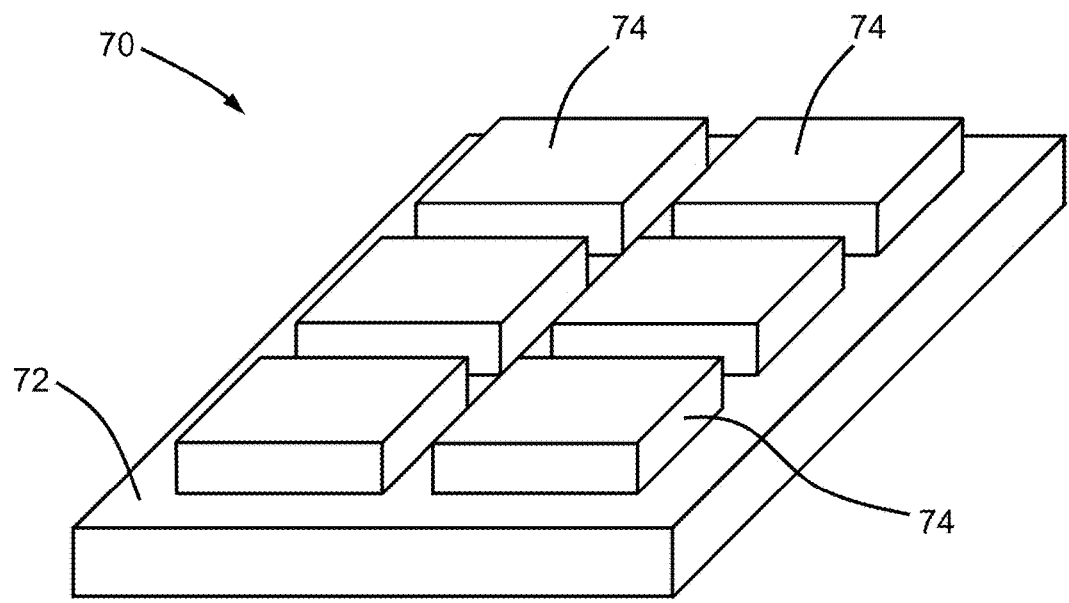
FIGS. 13-14 are schematic perspective views of a stamp and a roller, respectively, each having embossments thereon for forming low porosity regions on coating layers.
Figure 14:
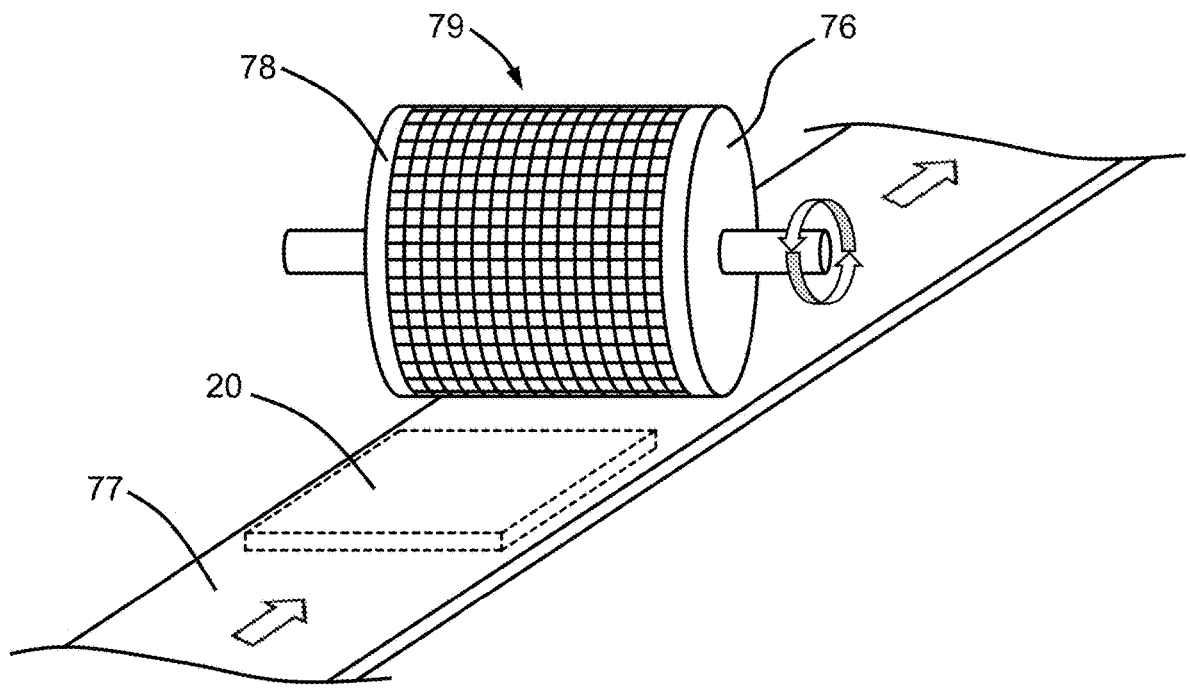
Figure 15A:
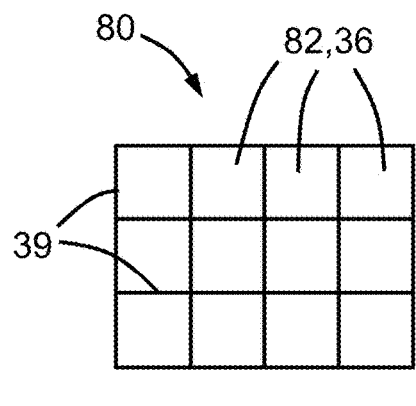
FIGS. 15A-H show schematic partial plan views of various tileable shapes for the LP/HD regions.
Figure 15B:
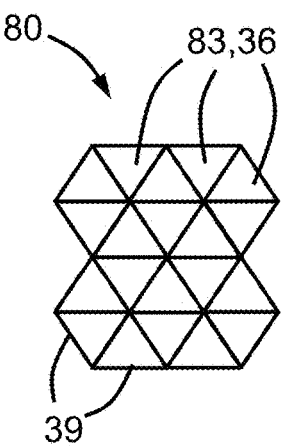
Figure 15C:
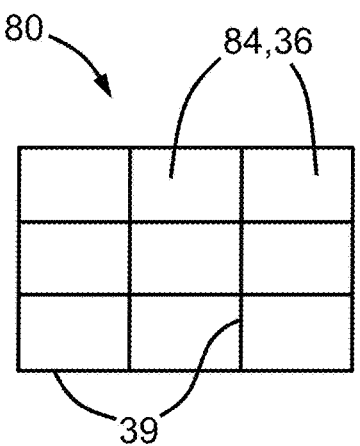
Figure 15D:
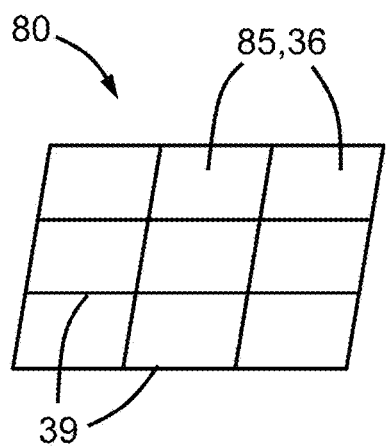
Figure 15E:
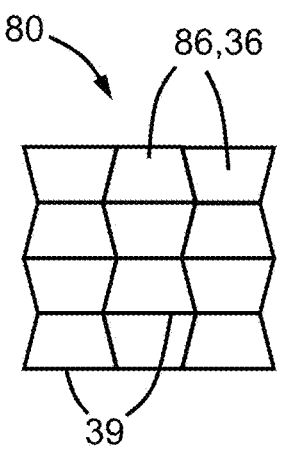
Figure 15F:
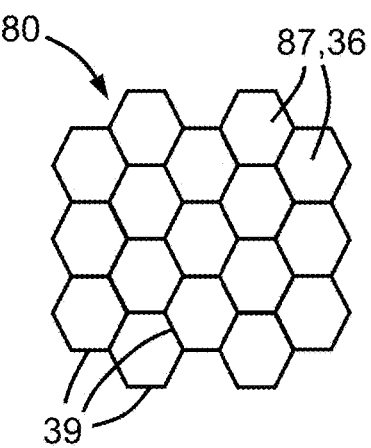
Figure 15G:
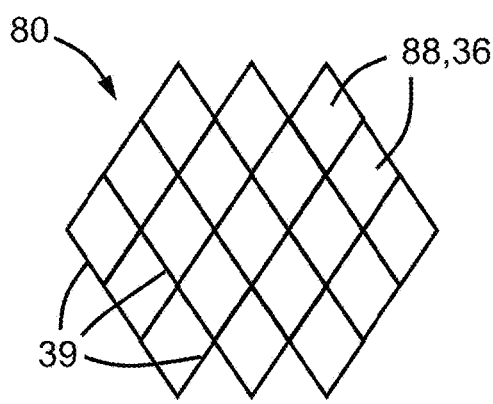
Figure 15H:
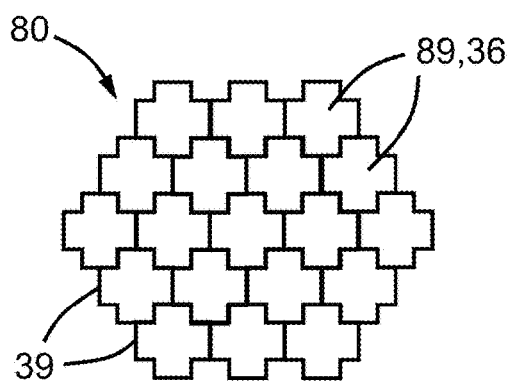
Figure 16A:
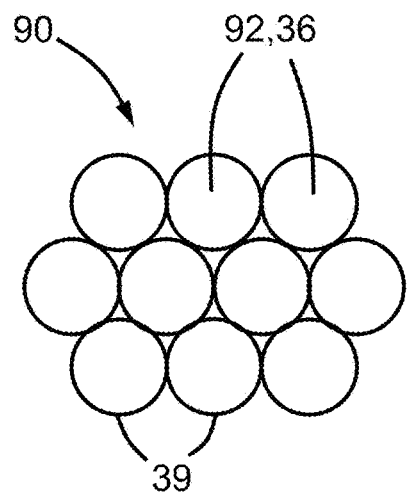
FIGS. 16A-F show schematic partial plan views of various non-tileable shapes for the LP/HD regions.
Figure 16B:
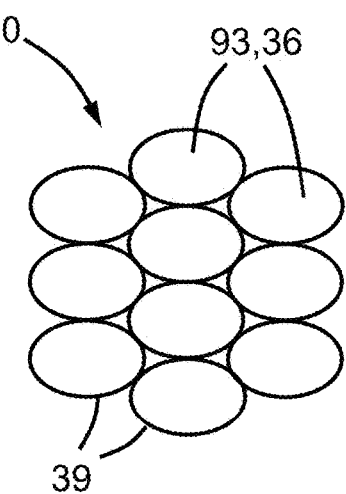
Figure 16C:
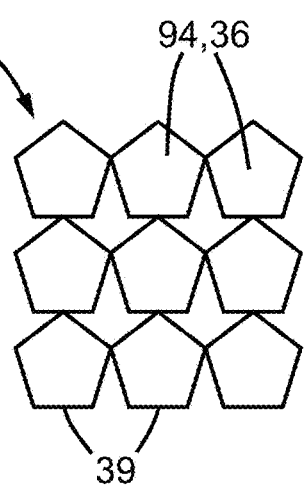
Figure 16D:
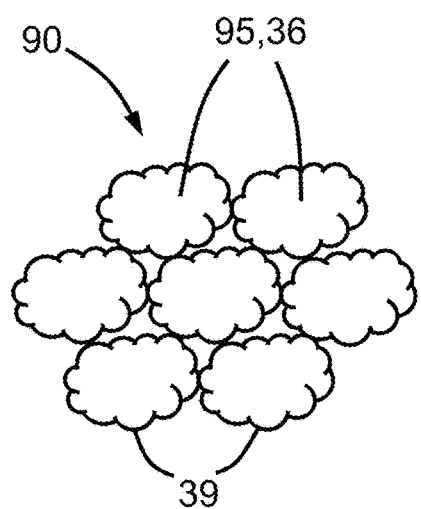
Figure 16E:
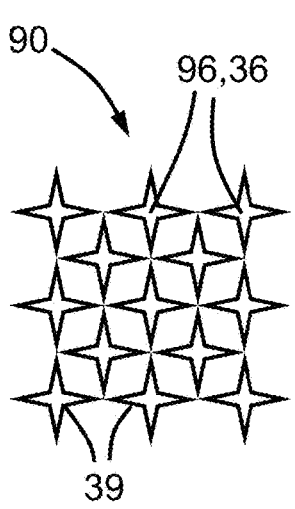
Figure 16F:
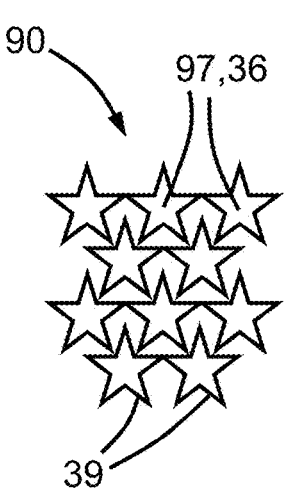

FIGS. 13-14 show schematic perspective views of a stamp 70 and a roller 76, respectively, either of which may be used for forming the LP/HD regions 36, 46, 56 on each coating layer 30, 40, 50. The stamp 70 has a plurality of embossments 74 formed on a flat patterning surface 72 of the stamp 70, while the roller 76 has a plurality of embossments 79 formed on a cylindrical patterning surface 78 of the roller 76. The respective embossments 74, 79 on the stamp 70 and roller 76 are sized, shaped and arranged so as to be capable of impressing the respective exposed surface 33, 43, 53 of each coating layer 30, 40, 50 to produce the two-dimensional arrays 32, 42, 52 of LP/HD regions 36, 46, 56. For the case of using the stamp 70, the stamp 70 may be inverted and pressed onto the exposed surface 33, 43, 53 of each coating layer 30, 40, 50. For the case of using the roller 76, an in-process battery electrode 20 may be placed on a conveyor 77 which feeds the electrode 20 underneath and against the embossments 79 as the roller 76 rolls at a rate corresponding to the conveyor speed.

FIGS. 15A-H show schematic partial plan views of various tileable shapes 80 for the LP/HD regions 36, and FIGS. 16A-F show schematic partial plan views of various non-tileable shapes 90 for the LP/HD regions 36. (Note that while only reference numerals 36 and 39 are used in the drawings to represent the LP/HD regions 36 and HP/LD regions 39 of a single coating layer 30, these shapes 80, 90 and patterns also apply to the LP/HD regions 46, 56 and HP/LD regions 49, 59 of the other coating layers 40, 50 as well.) As used herein, "tileable" refers to a shape that may be neatly fit together with others of the same shape without any gaps therebetween, while "non-tileable" shapes cannot be fit together without gaps therebetween. Note that since FIGS. 15A-H and 16A-F are only schematic drawings, they are primarily intended to show the shapes 80, 90 of the LP/HD regions 36, with the HP/LD regions 39 only being represented by the lines surroundably bordering and bounding the LP/HD regions 36. As shown in FIGS. 15A-H, the tileable shapes 80 include a square 82, a triangle 83, a non-square rectangle 84, a non-rectangular parallelogram 85, a trapezoid 86, a hexagon 87, a rhombus 88 and a cross shape 89. And as shown in FIGS. 16A-F, the non-tileable shapes 90 include a circle 92, an ellipse 93, a pentagon 94, a cloud shape 95, a four-pointed star shape 96 and a five-pointed star shape 97. Of course, other tileable shapes 80 and non-tileable shapes 90 in addition to those illustrated here may be used. The stamp 70 or roller 76 described above may be used to form the LP/HD regions 36 in a selected pattern of tileable shapes 80 or non-tileable shapes 90.

Figure 17:
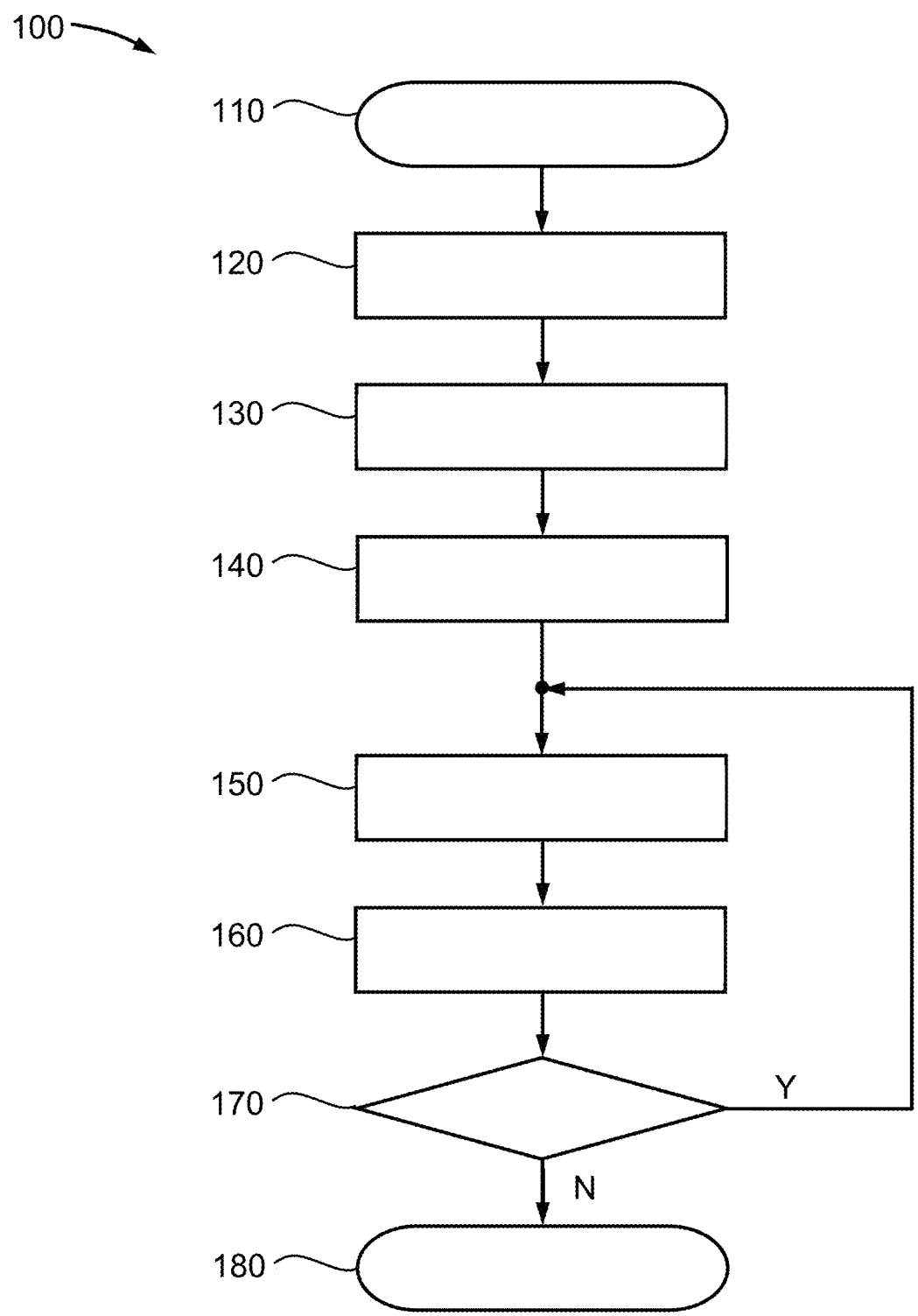
FIGS. 17-18 are flowcharts for first and second methods of manufacturing a battery electrode, respectively.

FIG. 17 shows a flowchart according to one embodiment, illustrating a first method 100 of manufacturing a multilayer battery electrode 20. This method 100 starts at block 110, and includes, at block 120, the step of providing an electrically conductive sheet 22 having opposed first and second surfaces 24, 26, with at least the first surface 24 being electrically conductive. Next, at block 130, a first or base coating layer 30 of an ion transport medium is applied onto the first surface 24 of the electrically conductive sheet 22. Then, at block 140, a two-dimensional array 32 of LP/HD impressed regions 36 is formed on a top surface 33 of the coating layer 30. At block 150, a subsequent or second coating layer 40 of the ion transport medium is applied onto the previously applied or first coating layer 30, and at block 160, a subsequent two-dimensional array 42 of LP/HD impressed regions 46 is formed on an exposed top surface 43 of the subsequent or second coating layer 40. At block 170, a check or decision is made as to whether a subsequent coating layer is needed; if the decision is yes ("Y"), then blocks 150 and 160 are repeated, typically for a plurality of cycles (applying subsequent coatings and forming subsequent two-dimensional arrays of LP/HD regions), until the check or decision at block 170 yields a no ("N") indicating that no further coating layers are needed, at which point the method 100 stops at block 180.

In this first method 100, a respective remainder 37, 47, 57 of each coating 30, 40, 50 that is not the respective two-dimensional array 32, 42, 52 of LP/HD regions 36, 46, 56 defines a respective network 38, 48, 58 of interconnected HP/LD regions 39, 49, 59, wherein, for each coating 30, 40, 50, each of the LP/HD regions 36, 46, 56 thereof is surroundably bordered by a respective one or more of the HP/LD regions 39, 49, 59 thereof. Each of the HP/LD regions 39, 49, 59 has a respective feature size D, and an intralayer pitch P is defined between adjacent ones of the HP/LD regions 39, 49, 59 of each coating, such that each pair of adjacent two-dimensional arrays 32, 42, 52 has a respective alignment error E therebetween and wherein a respective first electrically conductive path 64 is formed thereacross via the respective networks 32, 42, 52 of HP/LD regions 39, 49, 59 when D≤E≤P, and wherein a second electrically conductive path 66 is formed across all of the coatings 30, 40, 50 via the networks 32, 42, 52 of HP/LD regions 39, 49, 59.

Also in this first method 100, each two-dimensional array 32, 42, 52 may have substantially the same arrangement of LP/HD regions 36, 46, 56 and HP/LD 39, 49, 59 regions as each other two-dimensional array 32, 42, 52. For each coating layer 30, 40, 50, the LP/HD regions 36, 46, 56 thereof may have a lower porosity and/or a higher density than the HP/LD regions 39, 49, 59 thereof. Additionally, the feature size D may be a width as measured between adjacent LP/HD regions 36, 46, 56.

Further in this first method 100, each two-dimensional array 32, 42, 52 of LP/HD regions 36, 46, 56 may be formed using a stamp 70 or roller 76 having a pattern of embossments 74, 79 on a respective patterning surface 72, 78 thereof, wherein the embossments 74, 79 are arranged on the respective patterning surface 72, 78 so as to correspond to each two-dimensional array 32, 42, 52 of LP/HD regions 36, 46, 56. Each of the LP/HD regions 36, 46, 56 may have a respective tileable shape 80, wherein each respective tileable shape 80 may be one or more of a square 82, a triangle 83, a non-square rectangle 84, a non-rectangular parallelogram 85, a trapezoid 86, a hexagon 87, a rhombus 88 and a cross shape 89. Alternatively, each of the LP/HD regions 36, 46, 56 may have a respective non-tileable shape 90, wherein each respective non-tileable shape 90 may be one or more of a circle 92, an ellipse 93, a pentagon 94, a cloud shape 95 and a star shape 96, 97. In any of the above configurations, the ratio of the feature size D to the intralayer pitch P—i.e., D/P—may be greater than or equal to 0.10 and less than or equal to 0.50.

Figure 18:
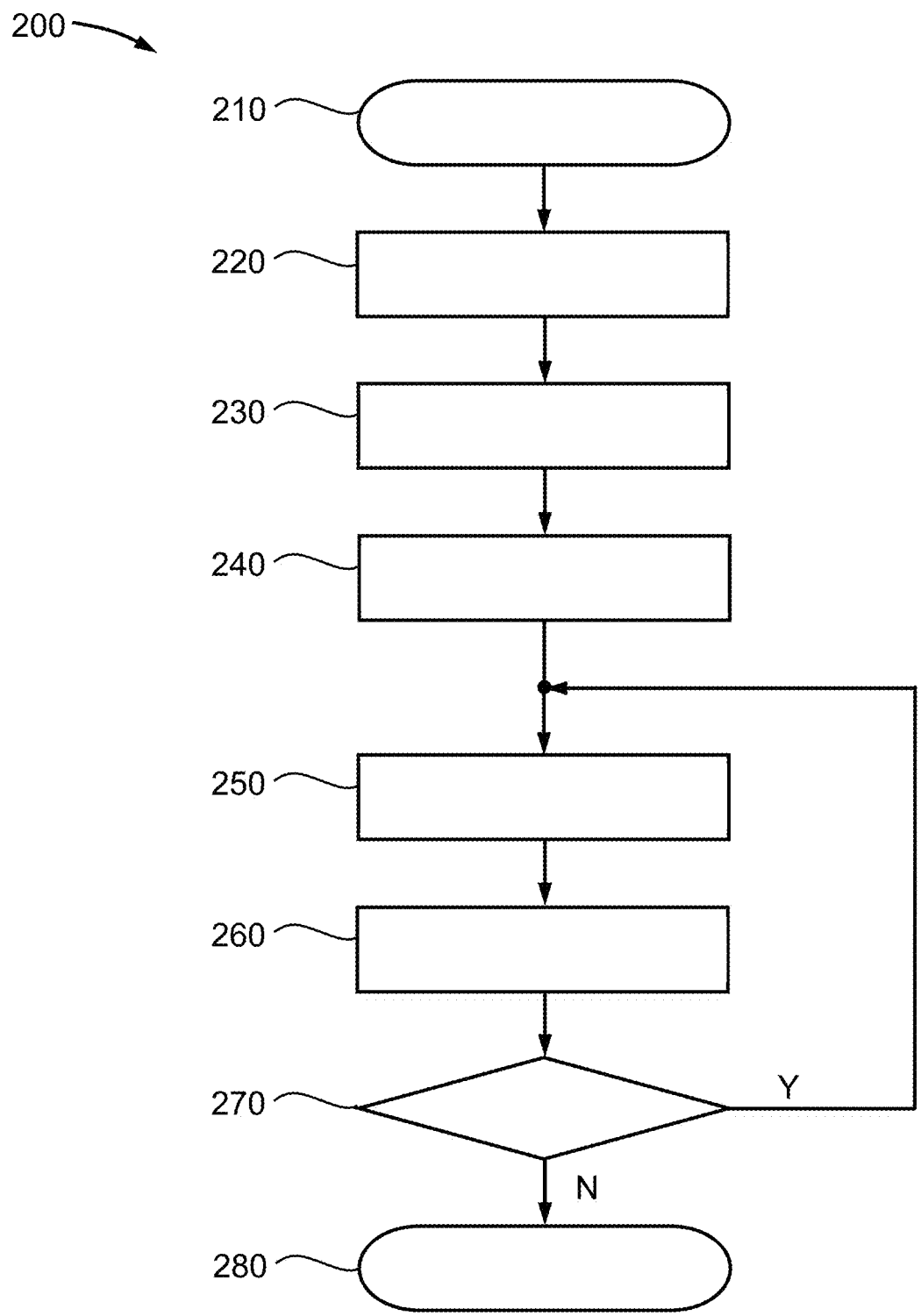

FIG. 18 shows a flowchart according to another embodiment, illustrating a second method 200 of manufacturing a multilayer battery electrode 20. This method 200 starts at block 210, and includes, at block 220, the step of providing an electrically conductive sheet 22 having opposed first and second surfaces 24, 26, with at least the first surface 24 being electrically conductive. Next, at block 230, a base coating layer 30 of an ion transport medium is applied onto the first surface 24 of the electrically conductive sheet 22. Then, at block 240, the base coating layer 30 is impressed (e.g., with a stamp 70, roller 76, or other tool or die) so as to form a two-dimensional array 32 of LP/HD impressed regions 36 on a top surface 33 of the coating layer 30. At block 250, a subsequent coating layer 40 of the ion transport medium is applied onto the previously applied coating layer 30, and at block 260, the subsequent coating layer 40 is impressed so as to form a subsequent two-dimensional array 42 of LP/HD impressed regions 46 on an exposed top surface 43 of the subsequent coating layer 40. At block 270, a check or decision is made whether another coating layer is needed; if yes ("Y"), then blocks 250 and 260 are repeated, typically for a plurality of cycles, until the check or decision yields a no ("N") indicating that no further coating layers are needed, at which point the method 200 stops at block 280.

In this second method 200, a respective remainder 37, 47, 57 of each coating layer that is not the respective two-dimensional array 32, 42, 52 of LP/HD impressed regions 36, 46, 56 defines a respective network 38, 48, 58 of interconnected HP/LD regions 39, 49, 59, wherein, for each coating layer 30, 40, 50, each of the LP/HD impressed regions 36, 46, 56 is surroundably bordered by a respective one or more of the HP/LD regions 39, 49, 59 thereof. Each of the HP/LD regions 39, 49, 59 has a respective feature size D characterized as a width as measured between adjacent LP/HD impressed regions 36, 46, 56, and an intralayer pitch P is defined between adjacent ones of the HP/LD regions 39, 49, 59 of each coating layer 30, 40, 50, such that each pair of adjacent two-dimensional arrays 32, 42, 52 has a respective alignment error E therebetween and wherein a respective first electrically conductive path 64 is formed thereacross via the respective networks 38, 48, 58 of HP/LD regions 39, 49, 59 when D≤E≤P, wherein a second electrically conductive path 66 is formed across all of the coating layers 30, 40, 50 via the networks 38, 48, 58 of HP/LD regions 39, 49, 59.

Further in this second method 200, each two-dimensional array 32, 42, 52 may have substantially the same arrangement of LP/HD impressed regions 36, 46, 56 and HP/LD regions 39, 49, 59 as each other two-dimensional array 32, 42, 52. For each coating layer 30, 40, 50, each of the LP/HD impressed regions 36, 46, 56 thereof may have a higher density and a lower porosity than the HP/LD regions 39, 49, 59 thereof. Each of the LP/HD impressed regions 36, 46, 56 may have a respective tileable shape 80 (wherein each respective tileable shape 80 is one or more of a square 82, a triangle 83, a non-square rectangle 84, a non-rectangular parallelogram 85, a trapezoid 86, a hexagon 87, a rhombus 88 and a cross shape 89) or a respective non-tileable shape 90 (wherein each respective non-tileable shape 90 is one or more of a circle 92, an ellipse 93, a pentagon 94, a cloud shape 95 and a star shape 96, 97).

Note that in the first method 100, the step at block 160 of forming a subsequent two-dimensional array 42 of LP/HD regions 46 may include offsetting the subsequent array 42 by a predetermined amount, such as ½ P (i.e., half of the intralayer pitch P). Likewise, in the second method 200, the step at block 260 of impressing the subsequent coating layer 40 to form a subsequent two-dimensional array 42 of LP/HD regions 46 may include offsetting the impression (and thus the subsequent array 42) by a predetermined amount, such as ½ P.

According to yet another embodiment, a battery electrode 20 includes an electrically conductive sheet 22 having a first surface 24, and two or more coating layers 30, 40, 50 of an ion transport medium stacked upon the first surface 24. Each coating layer 30, 40, 50 has a respective two-dimensional array 32, 42, 52 of LP/HD impressed regions 36, 46, 56 formed therein, wherein a respective remainder 37, 47, 57 of each coating layer 30, 40, 50 that is not the respective two-dimensional array 32, 42, 52 of LP/HD impressed regions 36, 46, 56 defines a respective network 38, 48, 58 of interconnected HP/LD regions 39, 49, 59, wherein, for each coating layer 30, 40, 50, each of the LP/HD impressed regions 36, 46, 56 thereof is surroundably bordered by a respective one or more of the HP/LD regions 39, 49, 59 thereof. Each of the HP/LD 39, 49, 59 regions has a respective feature size D and an intralayer pitch P is defined between adjacent ones of the HP/LD regions 39, 49, 59 of each coating layer, such that each pair of adjacent two-dimensional arrays 32, 42, 52 has a respective alignment error E therebetween, and wherein a respective first electrically conductive path 64 is formed thereacross via the respective networks 38, 48, 58 of HP/LD regions 39, 49, 59 when D≤E≤P, with a second electrically conductive path 66 being formed across all of the coating layers 30, 40, 50 via the networks 38, 48, 58 of HP/LD regions 39, 49, 59.

In the above battery electrode, each two-dimensional array 32, 42, 52 may have substantially the same arrangement of LP/HD impressed regions 36, 46, 56 and HP/LD regions 39, 49, 59 as each other two-dimensional array 32, 42, 52. For each coating layer 30, 40, 50, the feature size D may be a width as measured between adjacent LP/HD impressed regions 36, 46, 56, and the LP/HD impressed regions 36, 46, 56 thereof may have a lower porosity and a higher density than the HP/LD regions 39, 49, 59 thereof. Each of the LP/HD impressed regions 36, 46, 56 may have: (i) a respective tileable shape 80, wherein each respective tileable shape 80 is one or more of a square 82, a triangle 83, a non-square rectangle 84, a non-rectangular parallelogram 85, a trapezoid 86, a hexagon 87, a rhombus 88 and a cross shape 89; or (ii) a respective non-tileable shape 90, wherein each respective non-tileable shape 90 is one or more of a circle 92, an ellipse 93, a pentagon 94, a cloud shape 95 and a star shape 96, 97. The ratio of feature size to intralayer pitch D/P may have the range 0.10≤D/P≤0.50, or it may have the narrower range of 0.20≤D/P≤0.33.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely".

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of manufacturing a battery electrode, comprising:
    applying a coating of an ion transport medium onto a first surface of an electrically conductive sheet;
    forming a two-dimensional array of low porosity regions on the coating;
    applying a subsequent coating of the ion transport medium onto the previously applied coating; and
    forming a subsequent two-dimensional array of low porosity regions on the subsequent coating;
    wherein a respective remainder of each coating that is not the respective two-dimensional array of low porosity regions defines a respective network of interconnected high porosity regions, wherein, for each coating, each of the low porosity regions thereof is surroundably bordered by one or more of the high porosity regions thereof;
    wherein each of the high porosity regions has a respective feature size D and wherein an intralayer pitch P is defined between adjacent ones of the high porosity regions of each coating, such that each pair of adjacent two-dimensional arrays has a respective alignment error E therebetween and wherein a respective first electrically conductive path is formed thereacross via the respective networks of high porosity regions when D≤E≤P; and
    wherein a second electrically conductive path is formed across all of the coatings via the networks of high porosity regions.

2. The method according to claim 1, wherein each two-dimensional array has substantially the same arrangement of low porosity regions and high porosity regions as each other two-dimensional array.

3. The method according to claim 1, further comprising:
    repeating, for a plurality of cycles, the steps of applying a subsequent coating and forming a subsequent two-dimensional array of low porosity regions.

4. The method according to claim 1, wherein, for each coating, the low porosity regions thereof have a lower porosity than the high porosity regions thereof.

5. The method according to claim 1, wherein, for each coating, the low porosity regions thereof have a higher density than the high porosity regions thereof.

6. The method according to claim 1, wherein the feature size D is a width as measured between adjacent low porosity regions.

7. The method according to claim 1, wherein each two-dimensional array of low-porosity regions is formed using a stamp or roller having a pattern of embossments on a patterning surface thereof, wherein the embossments are arranged on the patterning surface so as to correspond to each two-dimensional array of low porosity regions.

8. The method according to claim 1, wherein each of the low porosity regions has a respective tileable shape, wherein each respective tileable shape is one or more of a square, a triangle, a non-square rectangle, a non-rectangular parallelogram, a trapezoid, a hexagon, a rhombus and a cross shape.

9. The method according to claim 1, wherein each of the low porosity regions has a respective non-tileable shape, wherein each respective non-tileable shape is one or more of a circle, an ellipse, a pentagon, a cloud shape and a star shape.

10. The method according to claim 1, wherein $0.10 \leq D/P \leq 0.50$.

11. A method of manufacturing a multilayer battery electrode, comprising:
(i) applying a coating layer of an ion transport medium onto a first surface of an electrically conductive sheet;
(ii) impressing the coating layer so as to form a two-dimensional array of high density impressed regions on a top surface of the coating layer;
(iii) applying a subsequent coating layer of the ion transport medium onto the previously applied coating layer;
(iv) impressing the subsequent coating layer so as to form a subsequent two-dimensional array of high density impressed regions on an exposed surface of the subsequent coating layer; and
(v) repeating steps (iii) and (iv) for a plurality of cycles;
wherein a respective remainder of each coating layer that is not the respective two-dimensional array of high density impressed regions defines a respective network of interconnected low density regions, wherein, for each coating layer, each of the high density impressed regions thereof is surroundably bordered by one or more of the low density regions thereof;
wherein each of the low density regions has a respective feature size D characterized as a width as measured between adjacent high density impressed regions and wherein an intralayer pitch P is defined between adjacent ones of the low density regions of each coating layer, such that each pair of adjacent two-dimensional arrays has a respective alignment error E therebetween, and wherein a respective first electrically conductive path is formed thereacross via the respective networks of low density regions when $D \leq E \leq P$; and
wherein a second electrically conductive path is formed across all of the coating layers via the networks of low density regions.

12. The method according to claim 11, wherein each two-dimensional array has substantially the same arrangement of high density impressed regions and low density regions as each other two-dimensional array.

13. The method according to claim 11, wherein, for each coating layer, the high density impressed regions thereof have a higher density and a lower porosity than the low density regions thereof.

14. The method according to claim 11, wherein each of the high density impressed regions has:
a respective tileable shape, wherein each respective tileable shape is one or more of a square, a triangle, a non-square rectangle, a non-rectangular parallelogram, a trapezoid, a hexagon, a rhombus and a cross shape; or
a respective non-tileable shape, wherein each respective non-tileable shape is one or more of a circle, an ellipse, a pentagon, a cloud shape and a star shape.

15. A battery electrode, comprising:
an electrically conductive sheet having a first surface; and
two or more coating layers of an ion transport medium stacked upon the first surface;
wherein each coating layer has a respective two-dimensional array of low porosity impressed regions formed therein, wherein a respective remainder of each coating layer that is not the respective two-dimensional array of low porosity impressed regions defines a respective network of interconnected high porosity regions, wherein, for each coating layer, each of the low porosity impressed regions thereof is surroundably bordered by one or more of the high porosity regions thereof;
wherein each of the high porosity regions has a respective feature size D and wherein an intralayer pitch P is defined between adjacent ones of the high porosity regions of each coating layer, such that each pair of adjacent two-dimensional arrays has a respective alignment error E therebetween, and wherein a respective first electrically conductive path is formed thereacross via the respective networks of high porosity regions when $D \leq E \leq P$; and
wherein a second electrically conductive path is formed across all of the coating layers via the networks of high porosity regions.

16. The battery electrode according to claim 15, wherein each two-dimensional array has substantially the same arrangement of low porosity impressed regions and high porosity regions as each other two-dimensional array.

17. The battery electrode according to claim 15, wherein, for each coating layer, the feature size D is a width as measured between adjacent low porosity impressed regions, and the low porosity impressed regions thereof have a lower porosity and a higher density than the high porosity regions thereof.

18. The battery electrode according to claim 15, wherein each of the low porosity impressed regions has:
a respective tileable shape, wherein each respective tileable shape is one or more of a square, a triangle, a non-square rectangle, a non-rectangular parallelogram, a trapezoid, a hexagon, a rhombus and a cross shape; or
a respective non-tileable shape, wherein each respective non-tileable shape is one or more of a circle, an ellipse, a pentagon, a cloud shape and a star shape.

19. The battery electrode according to claim 15, wherein $0.10 \leq D/P \leq 0.50$.

20. The battery electrode according to claim 15, wherein $0.20 \leq D/P \leq 0.33$.

* * * * *